United States Patent [19]

Hill

[11] 4,390,035
[45] Jun. 28, 1983

[54] LIQUID MIXING SYSTEMS

[76] Inventor: Raymond G. Hill, Hill Rd., Victoria, Tex. 77901

[21] Appl. No.: 256,527

[22] Filed: Apr. 22, 1981

[51] Int. Cl.³ .......................................... F16K 19/00
[52] U.S. Cl. ...................... 137/99; 91/267; 91/271; 222/132; 222/135; 222/145; 417/399
[58] Field of Search .................. 92/13.3; 137/99, 99.5; 91/267, 271; 222/57, 132, 135, 145; 417/399

[56] References Cited

U.S. PATENT DOCUMENTS

| | | | |
|---|---|---|---|
| 398,751 | 2/1889 | Rothenbucher | 91/267 X |
| 1,097,543 | 5/1914 | Glenn | 91/271 X |
| 2,887,094 | 5/1959 | Krukemeir | 137/99 X |
| 3,260,212 | 7/1966 | Johnson | 417/399 X |
| 3,330,211 | 7/1967 | Faro | 417/399 X |
| 3,815,621 | 6/1974 | Robinson | 137/99 |
| 3,967,634 | 7/1976 | Scherer | 137/99 |
| 4,269,327 | 5/1981 | Welch | 222/135 |

*Primary Examiner*—Robert G. Nilson

[57] ABSTRACT

A water-type spray application system employing a hydraulically-operated motor which is operated by the source of supply of the water or base carrier liquid and where the hydraulic motor dependently controls the amount of chemicals injected into the water system for application to lawns. The dependent chemical applications may be independently controlled and independently monitored as to the relationship of injection to the flow of water. The hydraulic motor employs a reciprocating piston and valving arrangement wherein the valving system operates to reverse the pressure differential across the piston upon reaching the end of the piston stroke so that a reciprocating action is obtained of a piston rod. The dependent metering systems involve an adjustable stroke mechanism which draws in liquids by suction and discharges fluids by pressure. The amount of fluids input and ejected from the metering system are a function of the stroke of the connecting rod from the hydraulic motor and the length of stroke applied to the piston rods can be varied.

8 Claims, 5 Drawing Figures

LIQUID MIXING SYSTEMS

FIELD OF THE INVENTION

This invention relates to metering systems for use in agricultural applications, and more particularly, to a system for mixing chemicals in pre-selected amounts to a water as a base liquid in a liquid spraying system where the mixing of the chemicals with the water as a base liquid is a dependent function of the rate of flow of the water.

BACKGROUND OF THE INVENTION

In agricultural, nursery and gardening applications, it is a common practice to use water as a base liquid and mix into the water, various chemicals such as fertilizer, fungicides, bacteriacides or other chemicals to control pests and weeds or to otherwise produce an effect on the material being sprayed. In the application of the chemicals, it is of course important to neither under apply or over apply specific chemicals because of adverse results and also because of cost. Heretofore, there have been no reliable systems for controlling the precise volume or ratio mixture of a chemical with a base fluid as water and no systems have been available for reliably mixing more than one chemical at a time. Thus, where a single batch is mixed, the specific chemical the mixture may not be applicable to other situations. In addition, where a single pump flow system is utilized for mixing of chemicals with water it is invariably inaccurate because of the inaccuracies of the flow of the pumping system relative to the supply of chemicals.

DESCRIPTION OF THE PRESENT INVENTION

The present invention involves a system for metering chemicals into a flow of water in which one of more chemicals may be accurately mixed in any precise proportion with the water and the mixing proportion will remain constant as a function of the volume of fluid flow. The present invention utilizes a reciprocating pump which operates in response to the flow of the water to the system and thus the rate of flow of the fluid controls the reciprocation of the motor. The reciprocating motor, in turn, controls a metering pumping system which meters the input of one or more chemicals to the flow of water in relationship to the pumping action.

The apparatus in accordance with the present invention includes a reciprocating motor member which is operated on a flow of fluid water and reciprocates a piston. The piston in the reciprocating motor, at each end of its travel actuates a set of valves to reverse the pressure differential on the piston and have the piston travel. A connecting rod connected to the piston provides a reciprocation of a crosshead. The crosshead, in turn selectively operates one or more rod pumping systems which respectively meter chemicals into the water supply in proportion to the flow of fluid water into the motor.

DESCRIPTION OF THE PREFERRED EMBODIMENT

Figure 1:
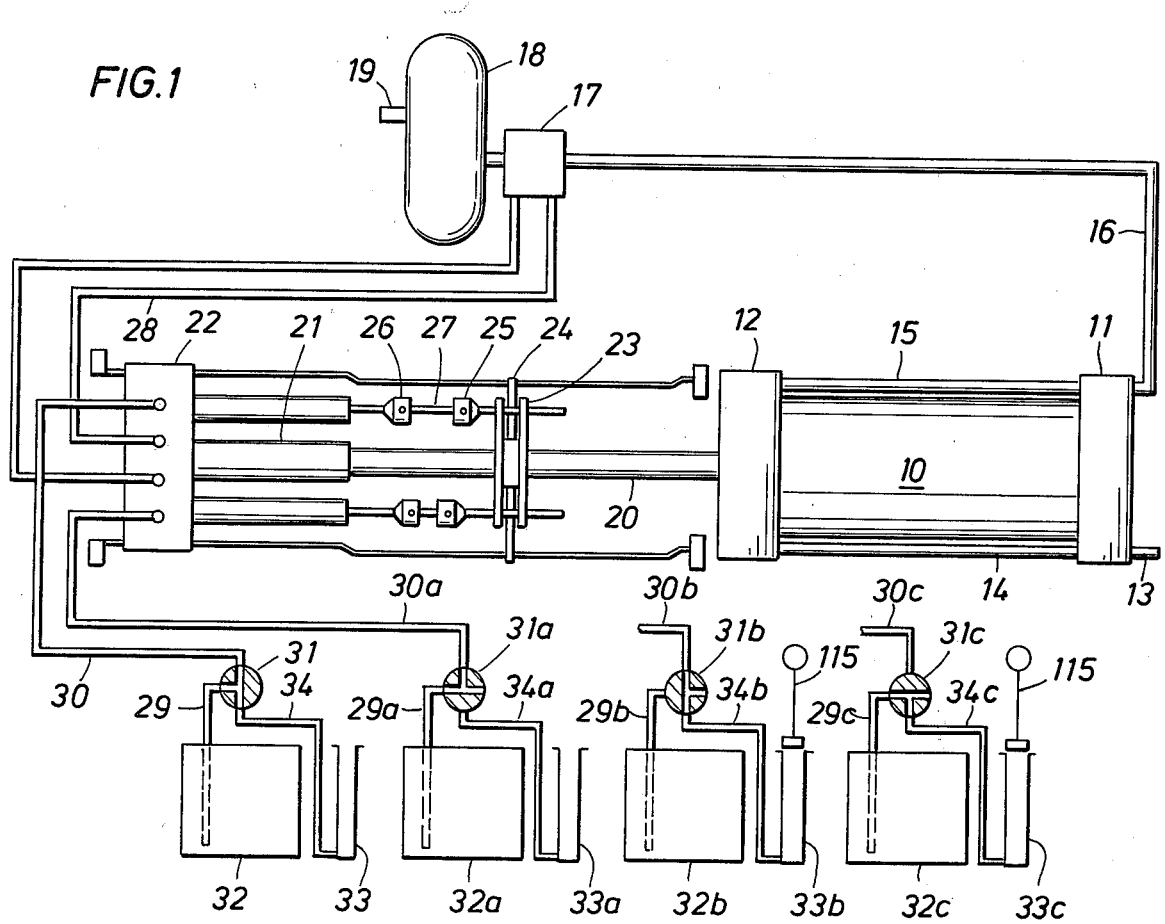
FIG. 1 is a schematic representation of the overall system embodying the present invention.

Referring now to FIG. 1, a hydraulic drive motor 10 has valve heads 11 and 12 which contain a valving system as hereinafter will be described. An input 13 for water or other liquids to the hydraulic motor 10 is coupled to the input side of the valve head 11 and the valve head 12. The connection of the input to the valve head 12 is provided by a fluid passageway 14 which interconnects the valve head 11 and the valve head 12. An output side of the valve head 11 and the output side of the valve head 12 has a fluid passageway 15 which interconnects the valve heads 12 and 11 to an output conduit 16. The output conduit 16 connects the motor 10 to an injection head 17. The chemicals to be mixed with the water input are injected with the flow of water at the the injection head 17 and the mixture of water and chemicals is connected to a mixing head 18 which has an output conduit 19. The output conduit 19 is used to apply the mixed fluids to the subject which is to be treated.

The drive motor 10 has a reciprocating piston which is attached to a piston rod 20. The other end of the piston rod is slidably received in a bushing mount 21 which is attached to a valve housing 22. The piston rod 20 is also attached midway of its length to a crosshead 23 which, in turn, carries a number of movable latches 24. The movable latches 24 are arranged to pivot about pivot axes so that upon movement of the crosshead 23 toward the valve housing 22, a latch will rise over the surface of a forward fixed engagement cam 25 and drop into a recess between a pair of engagement cams 25 and 26. The cams 25, 26 are carried on a rod 27. Continued forward movement of the crosshead 23 will bring the latch 24 into engagement with a cam 26 whereupon the rod 27 is moved forwardly to produce a piston effect within the valve housing 22 and inject a metered amount of chemicals into a conduit 28 which connects to the injection head 17.

The input of chemicals to the valve head 22 is provided by a conduit 30 which connects to a three way valve 31. The three way valve 31 interconnects the conduit 30 to either (1) a supply tank 32, (2) to a graduated metering glass 33, or (3) to both the tank 32 and glass 33. Suffice it to say for now, the amounts of chemical injected from the supply tank 32 through the valve housing 22 to the injection head 17 are a function of the distance that the rod 27 reciprocates. Movement of the rod 27, in turn, is a function of the reciprocation of the piston rod 20 which is controlled by the rate of fluid flow passing through the motor from the inlet 13 of the outlet 16.

Figure 2:
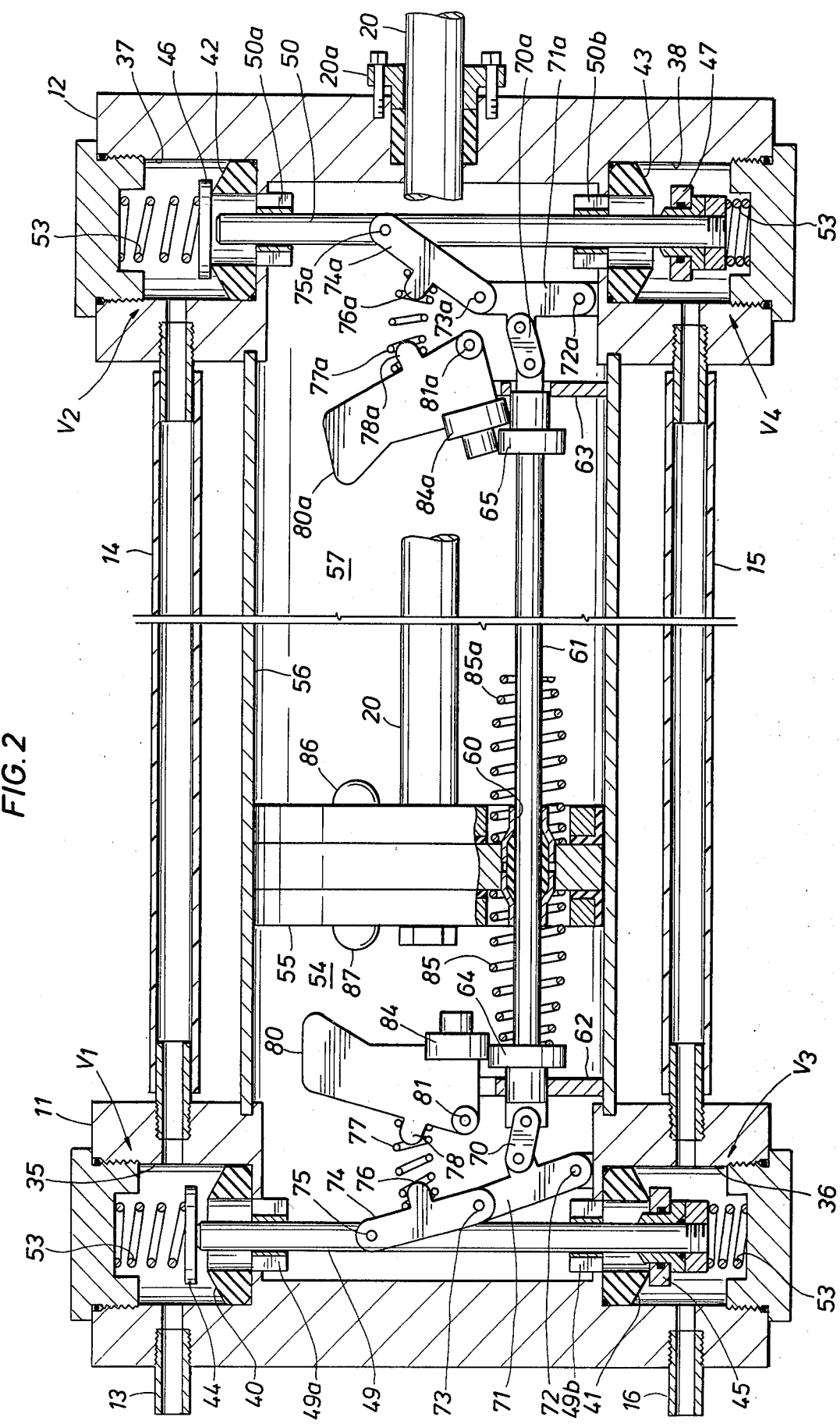
FIG. 2 is a view and cross section through the pumping motor of the present invention.

Referring now to FIG. 2, the hydraulic drive motor 10 is illustrated in cross section. In FIG. 2, the inlet pipe 13 which receives a liquid input from a supply or source of water is connected to the valve head 11 which is a cylindrically shaped block member. At diametrically opposed locations in the block member 11 are enclosed recesses 35 and 36. The recess 35 has the conduit opening for the passageway 14 in line with the input conduit 13 and the recess 36 has the passage passage 15 in line with the output conduit 16. Similarly, in the valve head 12 there are diametrically opposed recesses 37 and 38.

The recess 37 is coupled to the conduit 14 and the recess 38 is coupled to the passageway 15. The recesses 35 and 37 contain input valves designated as $V_1$ and $V_2$ while the recesses 36 and 38 contain output valves designated as $V_3$ and $V_4$. In each of the recesses 35 through 38 there is a valve seat 40, 41, 42 and 43. A valve closure member 44, 45, 46 and 47 is provided for each of the valve seats which respectively cooperate with corresponding valve seats for closing off the opening through a valve seat when a valve closure member is seated on a valve seat. The valve closure members 44 and 45 are interconnected by a valve shaft 49 while the valve members 46 and 47 are interconnected by a valve shaft 50. The valve shafts supported for reciprocation by bushings 49a, 49b and 50a, 50b so that the valve shafts can control the opening and closing of the valves. The shafts operate to alternately open an input valve in one valve head and an output valve in the other valve head. Spring members 53 are provided in each of the recesses 35, 36, 37 and 38 and the spring members 53 act upon the ends of the valve seats 44, 45, 46 and 47 to assist movement of the valve closure members between open and closed positions with respect to valve seats. In the position of the valves illustrated in FIG. 2, water being applied through the input conduit 13 enters through the valve seat of the open valve to a cylindrical piston chamber 54 and acts upon a piston 55 which is slidably and sealingly received within a piston cylinder 56. The other side of the piston 55 forms a piston chamber 57 which has access through an open valve in the valve head 12 to the conduit 15. The valves $V_1$ and $V_2$ control the input of fluid to the piston 55 from the input conduit 13 while the valves $V_3$ and $V_4$ control the output from the cylinder to the output conduit 16.

The valves $V_1$ through $V_4$ are coordinated by an internal mechanism within the cylinder 56 which is actuated by the piston 55. The piston 55 is connected to the piston rod 20 which is supported by a bushing 20a on the exterior of the motor 10 and provided with suitable fluid seals as necessary. To one side of the center of the axis of the piston 55 is a opening 60 which slidably and sealingly receives an actuating rod 61. The rod is slidably supported in the cylinder 56 by braces 62 and 63. Between the brace 62 and the piston 55, a fixed stop ring 64 is located on the rod 61. Between the brace 63 and the side of the piston 55, a fixed stop ring 65 is located on the rod 61. The end of the actuating rod 61 is connected by a link 70 to the midpoint of a toggle link 71. The toggle link 71 is pivoted at one end 72 to the valve housing 11 and pivoted at a location 73 to the other end of a toggle link 74. The toggle link 74 is pivotly connected at a location 75 to the valve shaft 49. The toggle link 74 has a projection 76 which receives one end of a spring 77, the other end of the spring being received over a projection 78 on a latch member 80. The latch member 80 is pivoted at a location 81 to the valve head 11. In the position of the latch member 80 shown, a wear pad 84 on the latch member is resiliently biased by the spring member 77 into engagement with the stop ring 64 on the rod 61. In the valve head 12 there is a parallel and similar construction consisting of: link 70a, toggle link 71a, pivoted end 72a, pivot location 73a, toggle link 74a, pivot location 75a, projection 76a, spring 77a, projection 78a, latch member 80a, pivot location 81a and wear pad 84a.

As the piston 55 moves toward the latching member 80a, the spring 85a which is mounted over the actuating rod 61 first engages the stop member 65 on the actuating rod 61 so that a resilient force is applied to the stop member 65. Shortly thereafter, further movement of the piston 55 causes a cam 86 on the piston 55 to engage the tip of the latch member 80a and pivot the latch member in a clockwise direction. Rotation of the latch member in a clockwise direction conpresses the spring 78a and when the wearpad 84a clears the edge of the stop member 65, the compression of spring 85a on the stop member 65 and the compression of spring 78a on the toggle 74a, causes the shafts 50 to shift. The movement of the shaft 50 opens the valve $V_2$ and closes the valve $V_4$. At the same time that this action occurs, the actuating rod 61 pulls the stop ring 64 from under the wearpad 84 and pulls on the toggle link 71 and the latch member 80 pivots in a clockwise direction so that the shaft 49 shifts to close the valve $V_1$ and open the valve $V_2$. Upon the shifting of the valve shafts 49 and 50 and the reversing of the valve conditions, the piston 55 reverses its direction of motion and when the piston reaches the end of its travel toward the left side of the drawing, the valve action will again be reversed.

From the foregoing description it will become appreciated that the flow of fluid applied to the input conduit 13 reciprocates the piston 55 as the flow passes through the motor. The piston rod 20 will be reciprocated through the length of travel of the piston 55 in the cylinder 56 at a speed which is a function of the applied flow of fluid.

Figure 3:
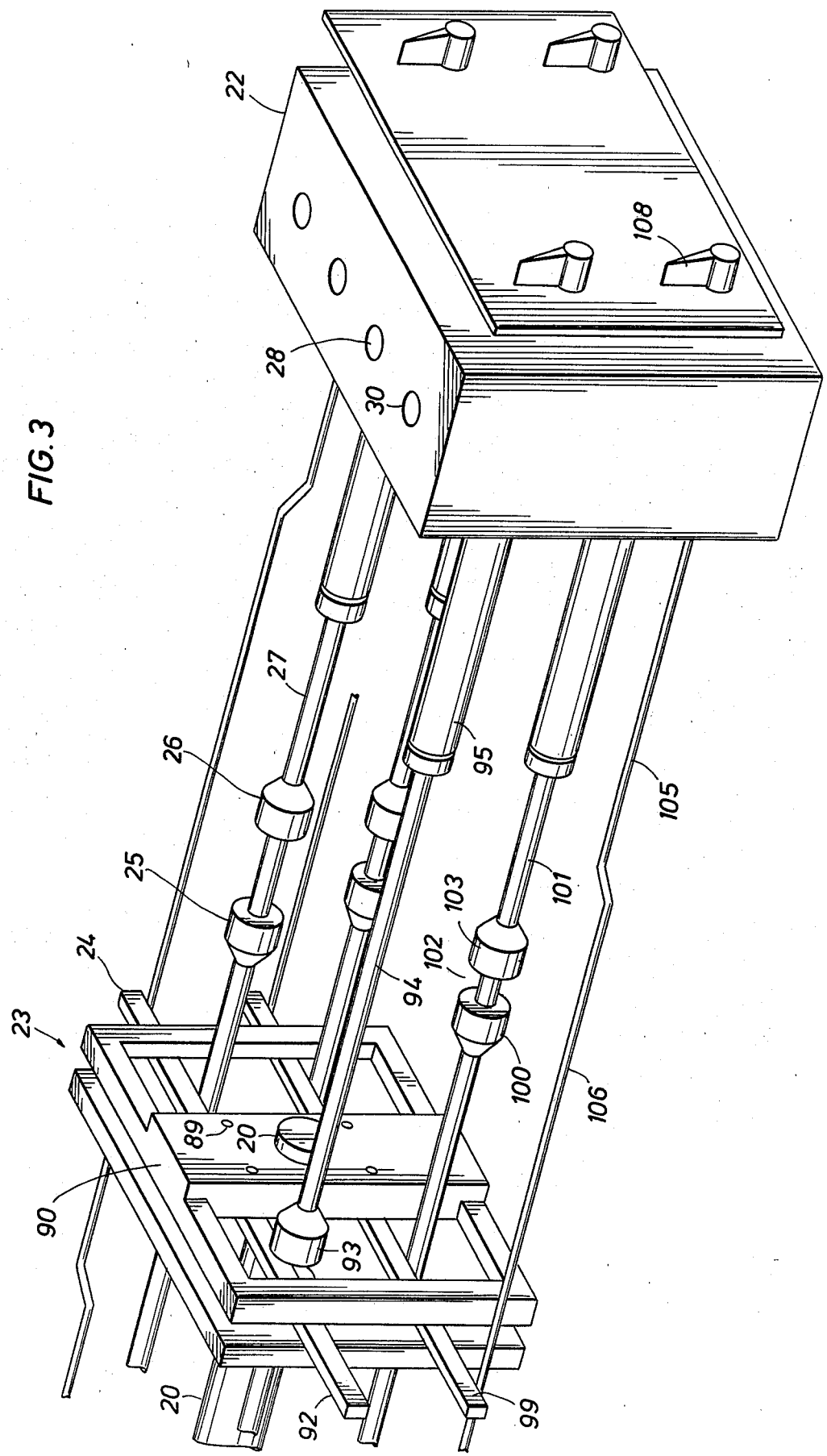
FIG. 3 is a view of the crosshead involved in the pumping system of the present invention.

Referring now to FIG. 3, the valve housing is shown with certain components deleted for purposes of simplifying the illustration in the drawing. The cross head 23 which is reciprocated back and forward is connected to the connecting rod 20. The connecting rod 20 is not shown between the cross head 23 and the valve housing 22 in FIG. 3 to better illustrate the action of the metering pumps. The cross head 23 has a framework on which a elongated latch 24 is pivotly mounted at a location 89 to a central vertical bar 90 of the cross head 23. There are four latch members illustrated in the cross head 23 with two latch members on each side of the central vertical bar 90 of the cross head 23. As illustrated, the upper left hand latch bar 92 is disposed behind an engagement cam 93 and upon movement of the cross head 23 to the right, the latch member 92 and cam 93 move the associated piston rod 94 into piston cylinder 95 attached to the valve housing 22. Similarly, the lower latch member 99, when the cross head 23 reaches the engagement cam 100 on the piston rod 101 will travel into the groove or recess 102 between the engagement cams 100 and 103 and can be retained in the recess 102. The latch member 99, for example, may be disengaged from the slot 102 between the engagement cams 100 and 103 by means of an elongated eccentric cam rod 105. The cam rod 105 has an offset portion 106 intermediate of its ends. The axis of a cam rod 105 is generally parallel to the axis of travel of the cross head 23. The cam rod 105 is connected to a position lever 108 which is in front of the valve housing 22 and mounted for rotation so that when a cam rod is rotated, the offset 106 will lift the associated latch member 99 in a clockwise direction and raise it sufficiently so that it is released from the engagement cams 100 and 103. Thus when the latch member 99 is raised or lifted out of the slot 102, the latch member 99 will reciprocate on the offset portion 106 of the cam rod 105 without ever engaging the engagement cams. The engagement cam 100 is slidably received on the piston rod and is attached thereto by allen screws. Thus, the engagement cam may be moved to different positions on the rod 101 to provide for different metering action as described. A calibration scale may be provided on the rod 101 to predict the metered volume.

Figure 4:
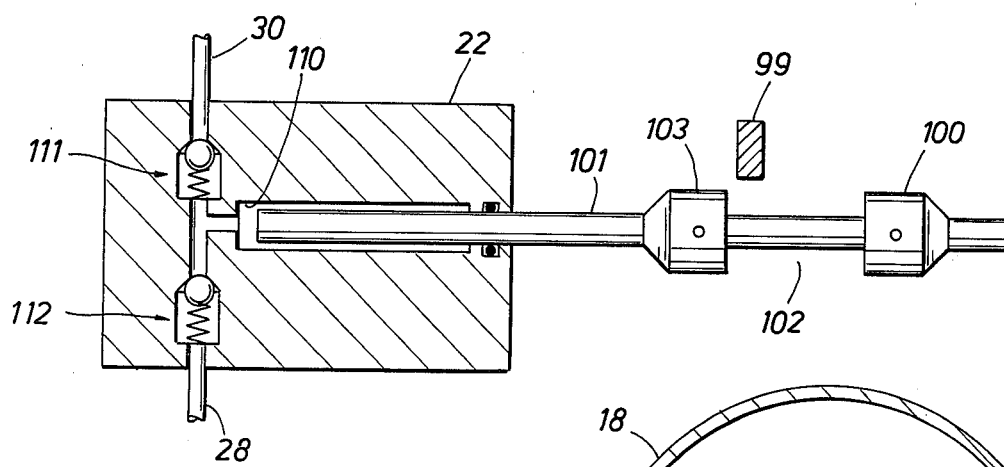
FIG. 4 is a schematic representation of the metering pump for the chemicals.

While only one rod 101 and latch member 99 have been specifically described, there are four such systems as contemplated in the illustration of FIG. 3. In the body of the valve housing 22, as shown more particularly in FIG. 4, is a piston chamber 110 which receives a piston rod 101. The piston chamber 110 opens to one way valves 111 and 112. The valve 111 is connected to a chemical supply tank 32 by a conduit 30 so that when the piston rod moves to the right a suction is created in the chamber 110 and the chemicals from the supply tank 32 are drawn into the piston chamber 110 through the check valve 111. Upon the return stroke of the piston rod 101 the chemicals in the piston chamber 110 are forced out to the injection head 17 via the conduit 28 and the check valve 112. The check valves 111, 112 as illustrated, are simple ball and spring type check valves which are commonly used.

As shown in FIG. 4, the engagement cam 100, 103 on the piston rod 101 regulate the length of stroke of the piston rod 101 relative to the piston chamber 110. With the left hand engagement cam 103 in the position shown, the piston rod 101 is at its one extreme position of travel within the piston chamber 110 in the valve housing 22. When the latching member 99 is moved toward the right, the piston rod 101 does not move until the latching member 99 engages the shoulder of the other engagement cam 100. Thereafter, the further travel of the latch member after engagement of the latch member and engagement cam 100 determine the amount of fluid which is metered or drawn into the piston chamber 110.

Figure 5:
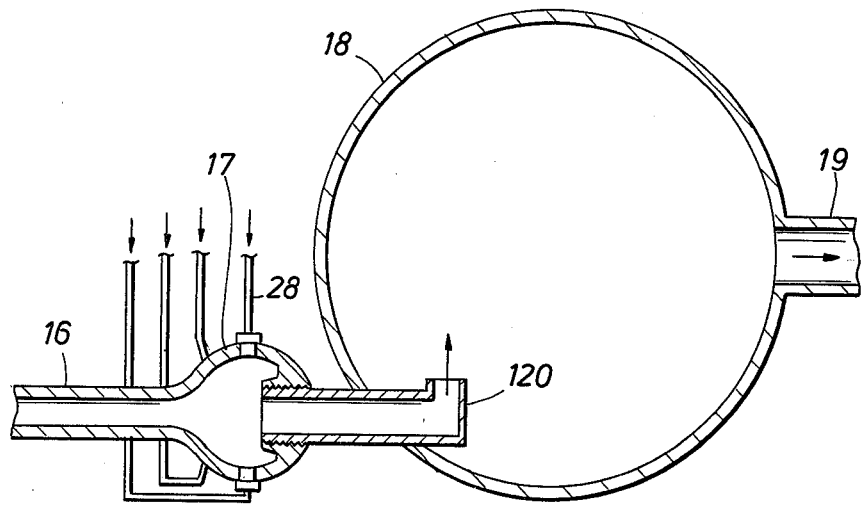
FIG. 5 is a view and cross section through the mixing head for the chemicals.

Referring now to FIG. 5 a cross-section through the injector head 17 and mixer 18 are illustrated. The input conduit 16 containing water enters into a head 17 which has input conduits 28 whereby the chemicals are injected into the flow of water through the conduit 16. The mixing head 18 is cylindrically shaped and the conduit 16 has a right angle portion which induces the water tangentially into the mixing head so that the chemicals and water are mixed thoroughly within the mixing head 18 before exiting through the output conduit 19.

Referring now again to FIG. 1, the operation of the apparatus may be understood as follows: The input conduit 13 receives the flow of fluid into the hydraulic motor 10 so that the piston rod 20 reciprocates as a function of the flow of water into the drive motor 10. The reciprocation of the piston rod 20 in turn reciprocates the metering rods 27 for the chemicals so that the chemicals are displaced into the water as a function of the reciprocation of the piston rod. Thus the mixing of the chemicals is a function of the flow rate of the water to the system, and a precise measurement can be obtained of the mixing of chemicals and water.

As illustrated in FIG. 1, with the three-way valve 31 in the position shown, the pump conduit 30 is connected to the tank conduit 29 and to the glass sight gage conduit 34. In this position of the valve 31, the sight gauge indicates the level of fluid in the tank 32. The valve 31a is shown in another position where the pump conduit 30a is connected to the tank conduit 29a. In this position of the valve 31a liquid from the tank 32a is supplied to the pump means. The valve 31b is shown in a position where the pump conduit 30b is connected to the guage conduit 34b. In this position of the valve 31b liquid from the gauge 33b is supplied to the pump means. The valve 31c is shown in another position where the tank conduit 30b is connected to the guage conduit 34c.

The valves 31–31c illustrate various operating positions. In the position shown for the valve 31c, a plunger 115 can be inserted into a filled sight guage 33c to expell air from the conduits 34c and 30b. Similarly in the position shown for the valve 31b, a plunger 115 can be inserted into a filled sight guage 33b to expell air from the conduits 34b, 30b and the conduits to the head 17. In the position shown for the valve 31b, when the system is operated fluid is pumped from the guage 33b which is calibrated in tenth ounces and milliliters. This permits instant calibration to the flow of water. Once calibration is obtained, the valve can be switched the position shown by valve 31a so that fluid is pumped from the tank. When the chemicals are passed through the metering housing 22 and injected into the injection head 17, the amount of chemicals pumped over a unit of time is calibrated to the water rate. It makes no difference how fast the rate of water is applied to the hydraulic motor because the amount of fluid or ratio of the fluid from the sight gage 33 or tank is proportional to the rate of water flow through the motor 10. Once the relationship between the amount of desired chemicals to be mixed in the water is established, it can be reliably obtained and maintained. After the operator is satisfied that the proper metering ratio of chemicals to water is obtained from the sight guage, the three-way valve 31 is switched so that the chemicals may be obtained from the supply tank 32. In the operation of the system, the reciprocation of the flow of the crosshead 23 brings the latches 24 into the recesses 27 if the cam rods are in a position to permit the latches to engage the recess. The control of the operation of the latches is made by the control knobs 108 on the control housing.

The system which is described herein operates mostly at a low volume of three to six gallons per minute and a low pressure of say 60 to 150 pounds per square inch. It has the advantages that it can dispense any number of chemicals into the flow of fluid without requiring a premix in a single tank. Thus it eliminates the wasteful general tankmix operation. Each of the chemical inputs can be independently controlled as to the amount of concentrate to be injected or can be turned on or off as a selective matter. The chemicals are mixed by a dependent mixing system which controls the mixture of the chemicals to the flow of water. While a certain type of application has been described herein, it will be appreciated that the present invention may be adapted to other types of applications, and it is intended that the present invention be defined in the scope of claims set forth hereinafter.

I claim:

1. A system for mixing liquids in a proportional relationship comprising:
hydraulic motor means having a piston mounted for reciprocation in a cylinder between two longitudinal positions, said piston having a piston rod connected thereto and extending outwardly from said cylinder;
input fluid passage means coupled to an input valve means at each of said longitudinal positions;
output fluid passage means coupled to an output valve means at each of said longitudinal positions;
valve actuating means in said cylinder responsive to the position of said piston in said cylinder at each of said longitudinal positions for actuating said input and an output valve means;

means coupling said valve actuating means in said cylinder to said valve means at each of said longitudinal positions whereby actuation of a pair of input and output valve means by said piston at one longitudinal position also actuates the other pair of input and output valve means located at the other longitudinal position;

pump means having an input fluid means adapted for coupling to a source of mixing liquid and to an output fluid means, said pump means having a reciprocating means for pumping a mixing liquid from said pump means as a function of the stroke of said reciprocating means;

coupling means for interconnecting said piston rod to said reciprocating means of said pump means; and means for interconnecting the output fluid means of said pump means with the output fluid passage means for mixing the fluid outputs with one another.

2. The system as defined in claim 1 wherein said pump means includes more than one pump means and said coupling means are selectively operable for selectively interconnecting said pump means to said piston rod.

3. The system as defined in claim 2 wherein each of said coupling means has means for adjusting the effective stroke of said reciprocating means for varying the pumping rate of said pump means.

4. A system for mixing fluids in a proportional relationship comprising:

fluid actuated motor means having a cylinder, piston means slidably disposed in said cylinder for reciprocating motion with respect to said cylinder, a piston rod extending from said piston and externally of said cylinder, a pair of oppositely disposed valve means located at each end of said cylinder, separate fluid conduit means respectively connecting one of the valve means at one end of said cylinder to a valve means at the other end of said cylinder, an input conduit connected to one of a pair of valve means at one end of said cylinder and an output conduit connected to the other of a said pair of valve means at said one end of said cylinder, each of said valve means have a valve opening to the interior of said cylinder, valve closure means in each of said valve means for selectively closing of each of said valve openings from fluid flow through a valve means, valve operating means within said cylinder for each pair of valve means respectively opening one of a pair of valve means and closing the other of said pair of valve means whereby only one of said valve means is open at each end of said cylinder at any given time, said valve operating means being responsive to the travel of said piston to an end of said cylinder for alternating the open and closed position of said valve means at each end of said cylinder whereby a fluid input is applied to one side of said piston and fluid in the other side of said piston is supplied to said output conduit and upon the piston reaching an end of said cylinder the condition of the valve means are reversed and the fluid input is applied to the said other side of said piston and fluid on said one side is supplied to said output conduit; and fluid supply means for supplying a mixing fluid from a source of fluid to said output conduit including pump means mechanically coupled to said piston rod, said pump means being responsive to reciprocation of said piston rod for supplying a measured amount of fluid from a source of fluid to said output conduit.

5. The apparatus as set forth in claim 4 wherein said valve operating means including linkage means connected to a rod member, said piston having an opening for slidably and sealingly receiving said rod member.

6. The apparatus as set forth in claim 5 wherein said pump means includes a reciprocating member, coupling means for interconnecting said reciprocation member to said piston rod.

7. The apparatus as set forth in claim 6 wherein said reciprocating member and said coupling means have means for selectively connecting and disconnecting said reciprocating member with respect to said coupling means.

8. The apparatus as set forth in claim 6 and further including a plurality of pump means where each of said pump means supplies a mixing fluid from a source of fluid to said output conduit and each of said pump means is connected by a reciprocating member to said coupling means.

* * * * *